United States Patent

[11] 3,623,121

| [72] | Inventor | Gene Corgey<br>Cypress, Tex. |
|---|---|---|
| [21] | Appl. No. | 828,512 |
| [22] | Filed | May 28, 1969 |
| [45] | Patented | Nov. 23, 1971 |
| [73] | Assignee | GEO Space Corporation |

[54] ELECTROPHOTOGRAPHIC RECORDER
13 Claims, 7 Drawing Figs.

[52] U.S. Cl. .................................................. 346/74 P,
346/109, 346/145
[51] Int. Cl. .................................................. G03g 15/10,
G01d 11/24
[50] Field of Search ......................................... 346/109,
110, 108, 136, 145, 74 P; 95/89, 14; 242/73, 71.9, 68.7

[56] References Cited
UNITED STATES PATENTS

| 3,139,320 | 6/1964 | Johnson .................... | 346/145 |
| 3,216,021 | 11/1965 | Stefansson ................. | 346/136 |
| 3,389,402 | 6/1968 | Rosmanith ................. | 346/76 |
| 3,500,734 | 3/1970 | Lewis et al. ................ | 95/14 |

*Primary Examiner*—Joseph W. Hartary
*Attorney*—Michael P. Breston

ABSTRACT: A recording seismograph is provided which employs an electrophotographic recording process to provide a dry record or seismogram. The seismograph includes a multielement galvanometer, a light source, timing light signals and optical means for impinging the light traces on a chemically treated paper which has been properly charged prior to being exposed to the light traces. The exposed paper is then passed through a developer tank in which the paper is sprayed with a toner on the sensitized side of the paper only. Control of the toner spray achieves controlled development of the image. The paper storage and loading mechanism is mounted on the front door which allows easy loading of the recorder.

Gene Corgey
INVENTOR

BY Michael P. Breston
ATTORNEY

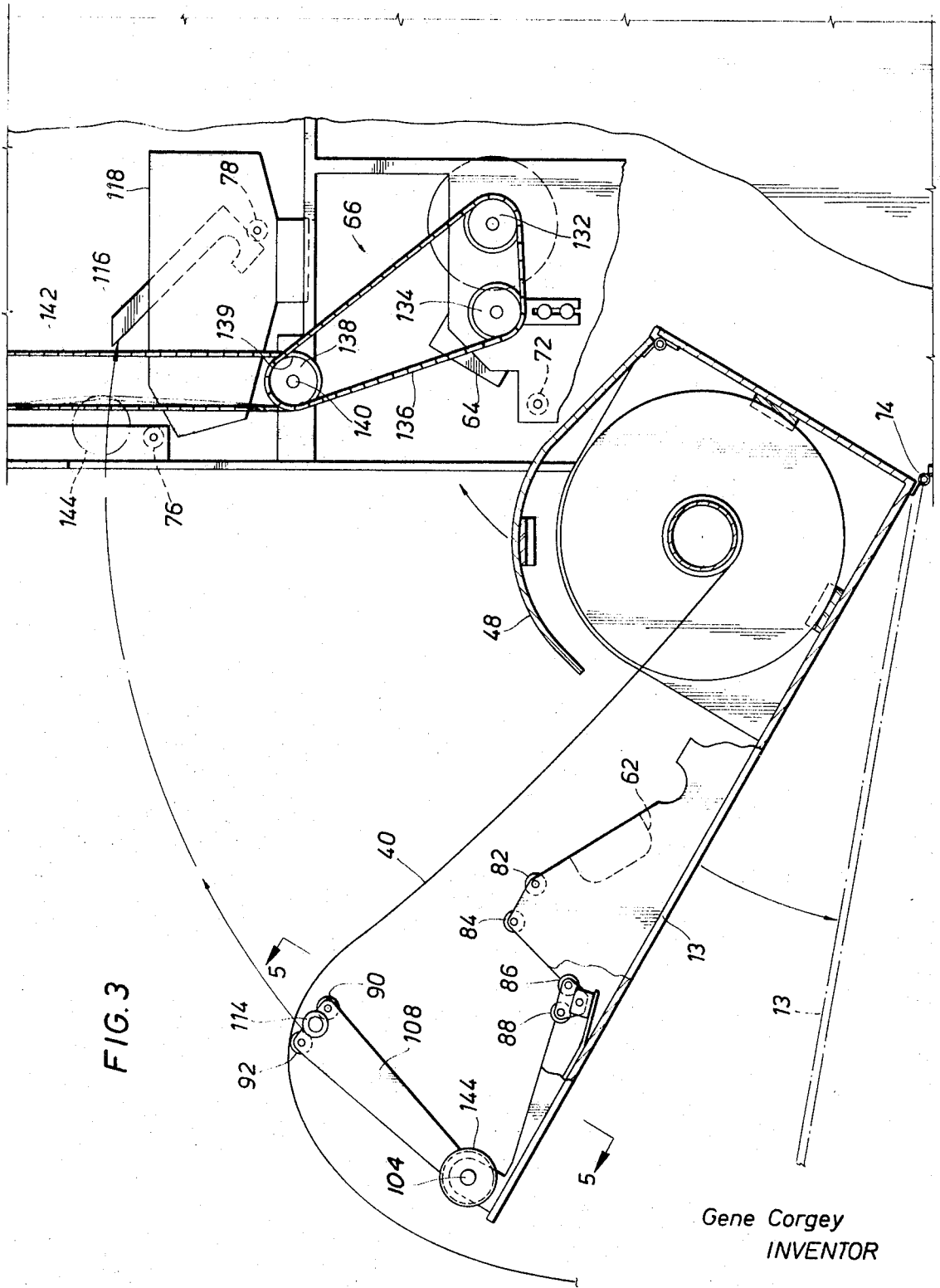

PATENTED NOV 23 1971

FPOM PUMP 186

Gene Corgey
INVENTOR

BY Michael P. Breston
ATTORNEY

ELECTROPHOTOGRAPHIC RECORDER

BACKGROUND OF THE INVENTION

The most common geophysical exploration method includes the steps of artificially inducing seismic disturbances either on land or at sea which disturbances cause seismic waves to propagate downwardly into the earth. The waves continue to travel downwardly within the earth until discontinuities are encountered in the earth structure which have the effect of reflecting at least a portion of the seismic waves back to the surface of the earth or of the sea. By suitably positioning arrays of detectors such as geophones or hydrophones at spaced points from the seismic disturbance or shot points, it is possible to detect the time of arrival of the reflected seismic waves. By using accurate timing devices as well as recording apparatus, it is possible to determine not only the magnitudes of the reflected signals received by the various detectors, but also to measure the time required for the seismic waves to travel from the shot points to the discontinuities in the earth structure and then back to the detectors.

It is conventional to first amplify the seismic signals generated by the various detectors and then record such signals by suitable recording apparatus which may take the form of a recording oscillograph, or a magnetic-photographic recording means capable of recording signals in the reproducible form, or an electrophotographic recorder.

It is desired for a seismograph (a device for recording seismic signals) to be capable of recording up to 64 or more seismic traces or channels simultaneously. These traces are conventionally arranged in a side-by-side manner together with timing indications at predetermined time intervals to allow the measurement of time along each trace.

The effectiveness and accuracy of exploration by seismic methods to a very great extent depend upon the ability of the observer at the time of conducting the seismic exploration to monitor the field results obtained with a recorder which is easy to use in the field, which can be readily loaded with the required recording medium, and which provides substantially instantaneously a useable record.

SUMMARY OF THE INVENTION

This invention provides a recording seismograph which employs the electrophotographic recording process to produce dry seismograms or records having high-contrast images. The recorder may be used in the field or in a central data processing office. An electrically operated pump is provided for filling a tank with liquid toner. The recording paper storage and loading mechanism affords automatic paper loading with a minimum of manipulations. Controlled spraying of the light-exposed paper side achieves fast drying without requiring a heat source or air current.

BRIEF DESCRIPTION OF THE DRAWINGS

FIG. 3 is a more detailed view of the paper storing and loading mechanism with the door both open and closed;

Referring to FIGS. 1 and 2 there is shown a photoelectric seismograph recorder generally designated as 10 including a housing 12 and a main door 13 which is hingedly secured as by a hinge 14 at its lower edge 15 to the housing 12. Door 13 is fastened to housing 12 by two fasteners 16. A viewing door 17 hingedly secured to main door 13 allows the operator to view the recording mechanism in operation and to make adjustments when necessary. A viewing screen 18 allows the operator to view the seismic traces as they are being recorded on the recording medium. A plurality of electric switches and instruments are mounted on the front panel of housing 12 to actuate and monitor the electrically operated devices of the recorder.

Figure 1:
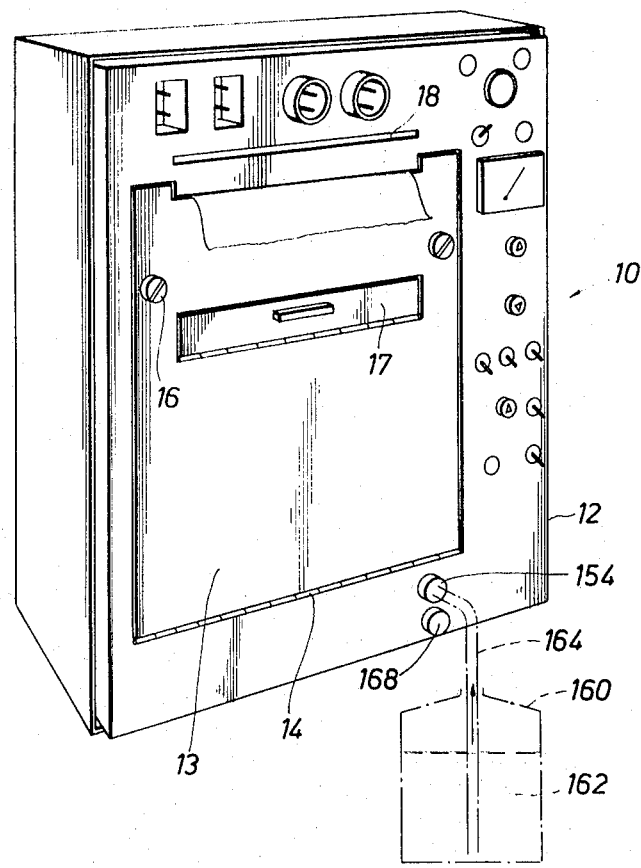
FIG. 1 shows in perspective a front view of the recorder of this invention.
Figure 4:
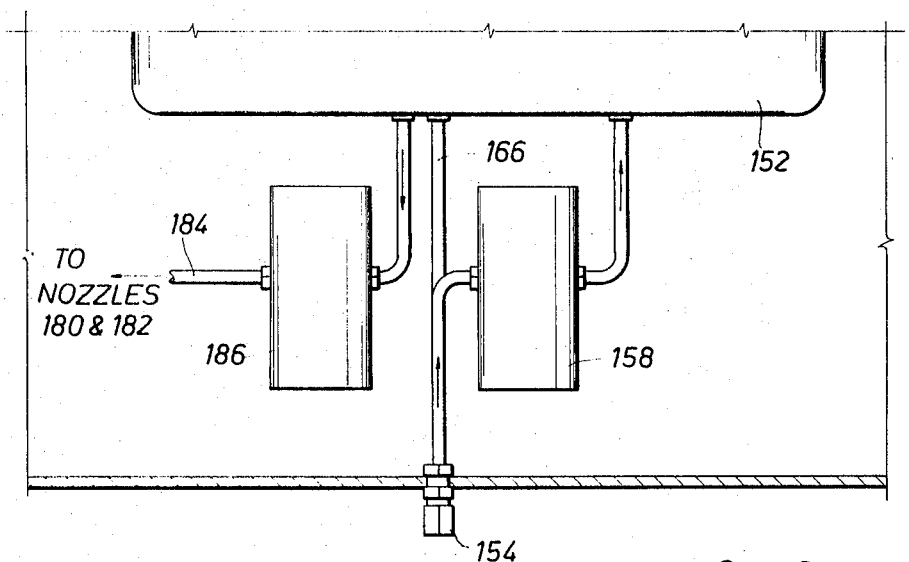
FIG. 4 is a view on line 4—4 in FIG. 2 which shows the toner tank and the electrically operated pumps associated therewith.

The electro-optical system will now be described. It includes a galvanometer light source 20 which provides a light beam 22 to a galvanometer mirror 24 forming part of a galvanometer block 26. Block 26 includes a plurality of galvanometers depending upon the number of recording channels desired. In the preferred embodiment shown in the drawings provision is made for block 26 to have up to 64 galvanometers. Beam 22 becomes reflected from galvanometer mirror 24 in dependence upon the electric signal applied to the galvanometer in a well-known manner. A portion 28 of beam 22 is channeled by mirror 32 and optical lense system 34 onto a recording window 35. In a similar manner each galvanometer mirror in block 26 provides to the recording window 35 a seismic photo signal. Another portion 30 of the reflected beam 22 is channeled by mirrors 23, 25 and by an optical lense system 27 onto the viewing screen 18 to allow the operator to monitor the seismic traces as they are being recorded. To be able to measure time on the recording medium, a timing light source 38 is mounted in housing 12 to provide a light time beam 36 which is also converged onto window 35 by an optical lense system 39.

Figure 6:
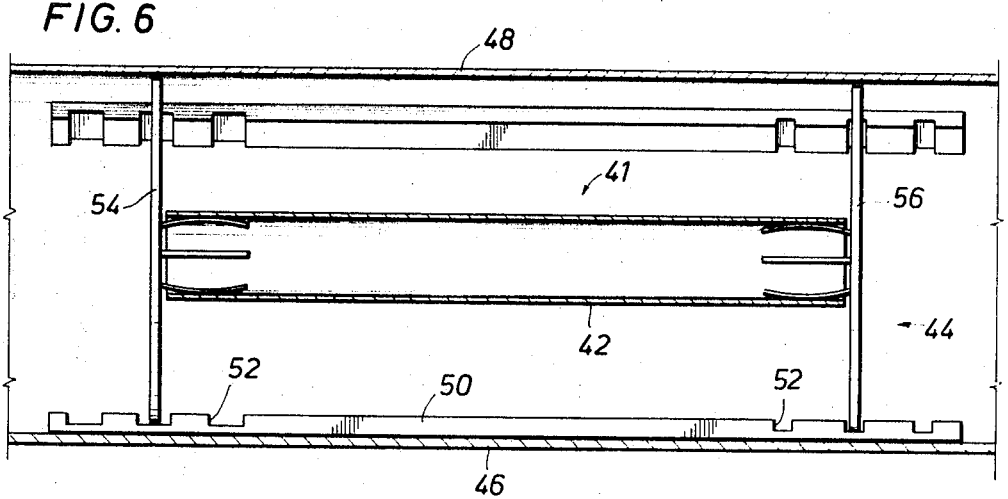
FIG. 6 is a view on line 6—6 in FIG. 2.

To record the signal and timing light beams there is provided a photoelectrically responsive recording medium such as paper 40. Paper 40 is commercially available and is typically a zinc-oxide-treated paper which comes in a spool 41 mounted on a core 42 (FIG. 6). The paper storage compartment generally designated as 44 is mounted on the main door 13 and includes a lower bracket 46 and a paper enclosure door 48. Three rails 50 are provided: one mounted on bracket 46, another on door 13, and the third on paper enclosure door 48. At each end of each rail 50 is provided a plurality of notches 52. To allow spool 41 to rotate on rails 50, core 42 is provided with two circular flanges 54, 56, the edges of which are nested in notches 52. It will be seen that the paper storage compartment 44 can be easily made to accept spools of paper of varying widths, for example, 6, 8, and 10 inches.

To electrically charge the chemically sensitized paper 40, there is provided a charger assembly 60 which includes two half sections 62, 64. Section 64 is mounted in housing 12 whereas section 62 is mounted on door 13. The function of charger 60 is conventional in the recorder art.

A paper drive mechanism, generally designated as 66, includes driving and driven rollers all cooperating to cause paper 40 to advance through the various stages of the recorder. Paper 40 moves outside recorder 10 through an opening 68. Some rollers are mounted on door 13 and some are mounted in housing 12. Thus, mounted in housing 12 is a guide roller 72, a main paper drive roller 74, a guide roller 76, a cleaning roller 78 and a pressure roller 80. Mounted on door 13 are guide rollers 82, 84 which stretch the paper 40 in front of recording window 35, pressure rollers 86, 88 which apply pressure on paper 40 against the main paper drive roller 74, guide rollers 90, 92, and auxiliary paper drive roller 94.

Figure 5:
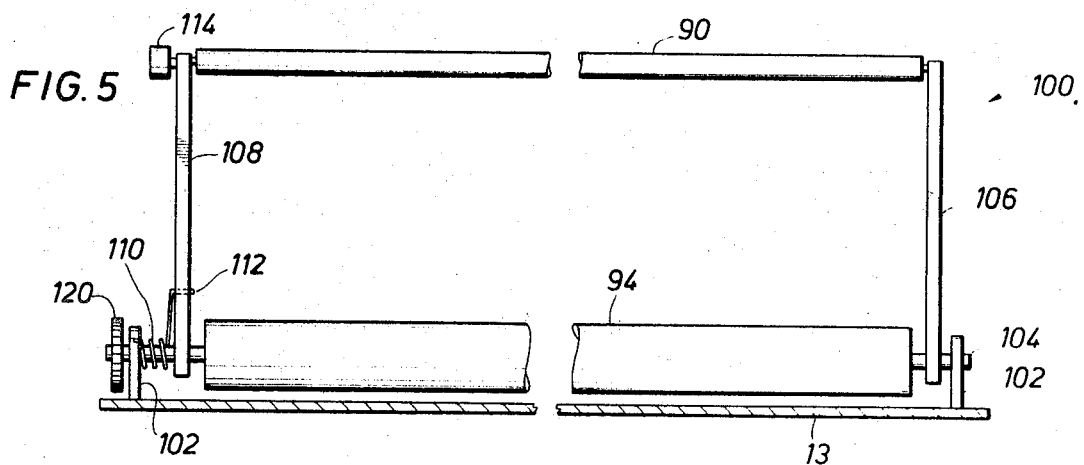
FIG. 5 is a view on line 5—5 in FIG. 3.

The pressure rollers 86, 88 are mounted on a resilient spring 96 secured to door 13. The guide rollers 90, 92 and 94 form part of a pivotally mounted subassembly, generally designated as 100 (FIG. 5), which includes two supporting studs 102, rotatably supporting a rod 104 on which the auxiliary paper drive roller 94 is rotatably mounted. Also rotatably mounted on rod 104 are two bracket arms 106, 108 for rotatably supporting guide rollers 90 and 92. A coil bias spring 110 is mounted on rod 104 and has a lip 112 under arm 108 to urge both arms 106 and 108 to an upright position when door 13 is opened. A roller 114 secured to arm 108 is caused to engage an inclining rail 116 (FIG. 3) positioned inside a toner enclosure 118. A sprocket 120 is secured to one end of rod 104.

The driving mechanism 66 for paper 40 (FIG. 3), includes a paper drive motor 132, an idler sprocket 134 for adjusting the driving tension of a chain 136 which engages a sprocket 138 fixedly mounted on shaft 140 of main paper drive roller 74. Another sprocket 139 mounted in back of sprocket 138 on shaft 140 provides the drive for one end of an elastic belt 142 the other end of which is supported by a sprocket (not shown). A sprocket 144 on shaft 104 of the auxiliary paper drive roller 94 engages under pressure the elastic belt 142, as shown in the right-hand drawing of FIG. 3, thereby allowing belt 142 to drive the auxiliary paper drive roller 94. Thus door 13 can open without interferring with the drive mechanism 66 which includes chains 136 and 142.

To develop the images recorded on paper 40 at the recording window 35, there is provided a toner storage and feed system, generally designated as 150, which includes a toner reservoir or tank 152. To fill tank 152 with liquid toner 162, there is provided a fill fitting 154, a line 156, and a fill pump 158 which is electrically driven. To fill reservoir 152 a container 160 with toner 162 is positioned near recorder 10. A flexible hose 164 is inserted from fitting 154 into container 160. The pump 158 is then energized and the toner 162 will fill tank 152. From tank 152 the toner 162 can be drained through a drain line 166 and a fitting 168.

Figure 7:
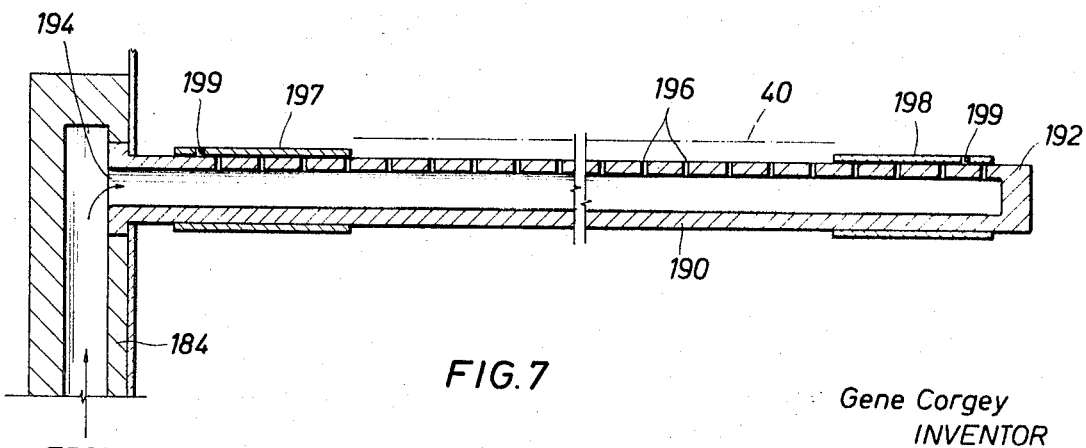
FIG. 7 is a view on line 7—7 in FIG. 2.

To develop paper 40 it is sprayed with liquid toner 162 as the paper moves through the toner enclosure 118. There are provided at least one but preferably two spray nozzles 180, 182. A supply line 184 is connected to the tank 152 through an electrically operated circulation pump 186. The supply line 184 feeds liquid toner under pressure to nozzles 180, 182 (FIG. 7). Each nozzle is made of a tubular member 190 having a closed end 192 and an open end 194 connected to the supply line 184. A plurality of apertures 196, aligned in a single row on a line parallel to the longitudinal axis of tube 190, forces liquid toner 162 out to wet the exposed paper 40. Two blanking sleeves or collars 197, 198 are slidably mounted on each end of tube 190 to blank or open a number of apertures depending on the width of paper 40 being processed by recorder 10. Collars 197, 198 are fastened to tube 190 by set screws 199. The excess toner from spray nozzles 180, 182 and the toner removed by wiper roller 78 become accumulated in a lower chamber 200 of enclosure 118. From chamber 200 the toner is drained back to the tank 152 through a drainpipe 202. Thus, a minimum amount of toner is actually applied to one side of the recording paper 40. Hence, a minimum of drying is required.

In operation of the seismograph recorder the main toner tank 152 is filled with a sufficient amount of toner, in a manner described, by actuating the fill pump 158. A spool 41 of paper 40 is inserted between the guide rails 50 by engaging flanges 54, 56 in the appropriate notches 52. The paper enclosure door 48 is then closed and a leader portion of paper 40 is pulled over (FIG. 3) the rocker subassembly 100. Door 13 is then closed causing the rocker subassembly 100 to pivot about its shaft 104 as the roller 114 slides down the inclined rail 116 to its lowermost position which coincides with the complete closure of door 13.

Figure 2:
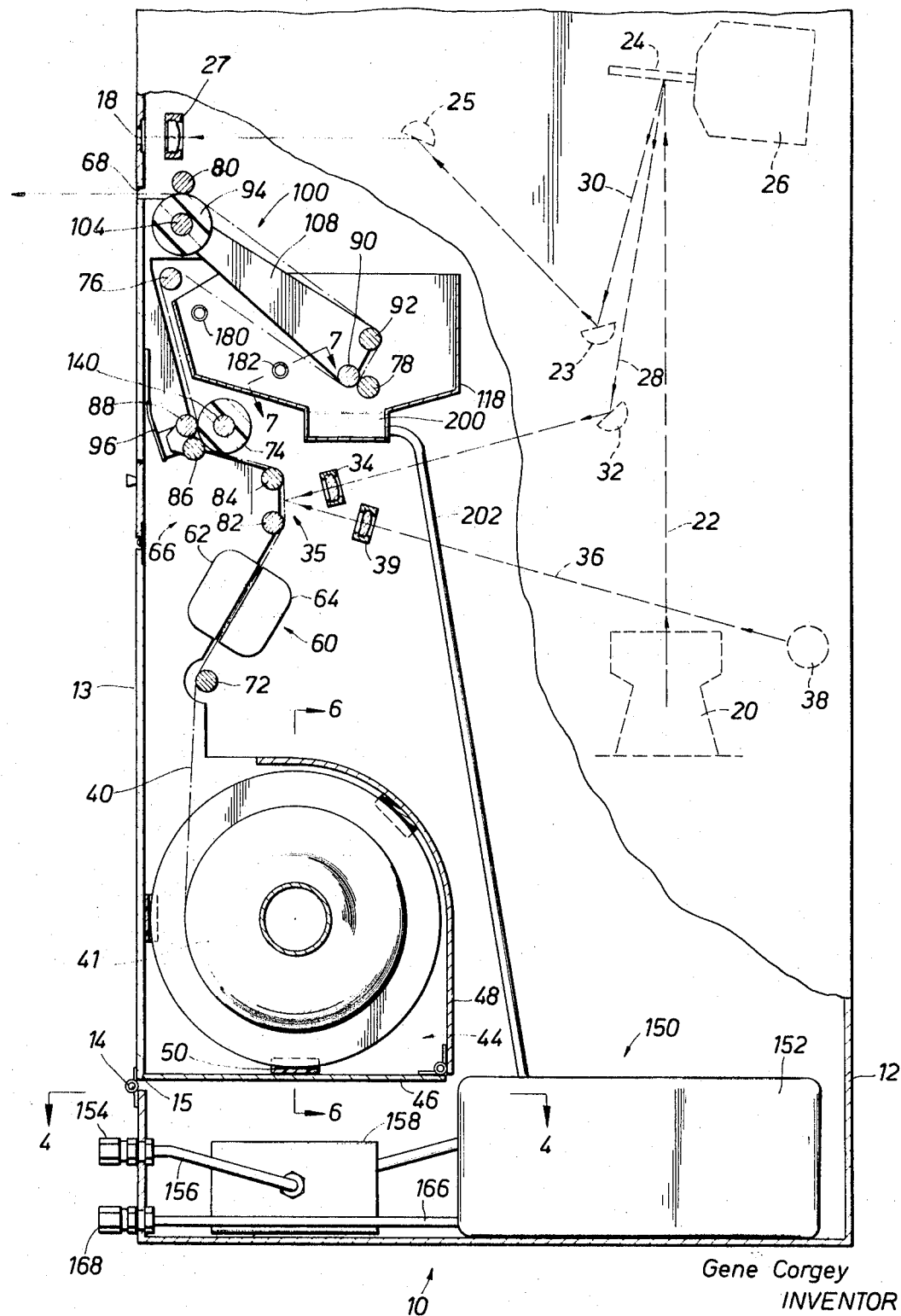
FIG. 2 is a center cutaway view partly in cross section of the recorder in FIG. 1.

When door 13 is closed, paper 40 is then positioned as shown in FIG. 2 relative to the cooperating driving and driven parts and a flat vertical portion of paper 40 becomes positioned in the focal planes of optical lense systems 34, 39 to become exposed to the seismic and timing light signals 28 and 36. As the paper is advanced through the toner enclosure 118, toner 162 is forced out through the apertures 196 to wet the light-exposed side of paper 40. The excess toner is removed by the cleaning roller 78 and the pool of toner in chamber 200 drains into the main toner tank 152. As the paper is being pulled out of recorder 10 by the auxiliary paper drive roller 94, it completes its drying cycle so that when it moves out of recorder 10 it is sufficiently dry for ready use.

While the seismic signals were recorded on paper 40 at the recording window 35, the same seismic signals were projected onto the viewing screen 18 to allow the operator to view them while they were being recorded.

What I claim is:

1. A seismic recorder for recording seismic signals including:
a housing;
an optical system including a galvanometer block to transmit optical signals to a recording window;
a door supported by and being displaceable from said housing;
a record medium;
storage means including a supply spool rotatably mounted on said door for storing said record medium;
record medium drive means mounted in said housing and on said door,
said drive means being operatively coupled to said supply spool for advancing said record medium through said recording window,
said drive means including a plurality of adjacently disposed rollers in said housing and on said door,
whereby when a leader portion of said record medium is initially pulled out of said spool with said door in its open position, said record medium becomes automatically engaged by said drive means upon closing of said door, and
said drive means further including a subassembly of rollers,
said subassembly being pivotally mounted on said door and being normally biased in a raised position when said door is open.

2. The recorder of claim 1 wherein said housing includes:
a toner enclosure,
liquid toner spray means in said enclosure, and
means pivoting said subassembly into said enclosure when said door is being closed, thereby causing said record medium to traverse through said enclosure.

3. The recorder of claim 2 wherein said toner spray means includes:
an elongated member having a plurality of apertures for spraying said record medium when it traverses through said toner enclosure.

4. The recorder of claim 3 wherein:
said elongated member is s tube and said apertures extend through the wall and along the length of said tube, and further including:
at least one collar mounted on said tube for closing one or more apertures depending on the width of said record medium.

5. The recorder of claim 4 and further including:
an electric charger assembly composed of two sections,
one of said sections being mounted in said housing, and
the other section being mounted on said door whereby when said door is closed said record medium becomes sandwiched between said two sections.

6. The recorder of claim 1 wherein:
said storage means includes at least two guide rails, and
means on said rails for accepting different length spools.

7. The recorder of claim 3 and further including:
a toner reservoir for storing liquid toner, and
an electrically operated pump for filling said reservoir with said toner.

8. The recorder of claim 7 and further including:
an electrically operated circulating pump for supplying liquid toner under pressure from said reservoir to said spray means and to one face of said record medium only.

9. The recorder of claim 8 wherein,
said subassembly includes a wiping roller for removing the excess liquid toner from said record medium.

10. The recorder of claim 4 wherein,
said spray means spray said liquid toner onto one side of said record medium only.

11. The recorder of claim 10 wherein said record medium is a chemically treated paper.

12. The recorder of claim 1 wherein said drive means further include:
a main drive roller rotatably mounted on a main drive shaft for advancing said record medium, and
an electrically operated motor for rotating said main drive shaft.

13. The recorder of claim 1 wherein said subassembly further includes:
an auxiliary drive roller,
an elastic band for driving said auxiliary drive roller from said drive means, and
rotatably mounted engaging means for engaging said band thereby driving said auxiliary roller only when said door is in its closed position.

* * * * *